(12) United States Patent
Pastusek et al.

(10) Patent No.: US 8,973,491 B1
(45) Date of Patent: Mar. 10, 2015

(54) SYSTEM FOR PROCESSING PRIMARY FOOD PRODUCT WASTE INTO SECONDARY FOOD PRODUCT

(71) Applicant: Sustainable Alternative Feed Enterprises, Reno, NV (US)

(72) Inventors: John Pastusek, Arlington, TX (US); Louis Anthony Pellegrini, Los Altos, CA (US); Kerry Zundel, Tremonton, UT (US); William L. Ford, Elberta, UT (US)

(73) Assignee: Sustainable Alternative Feed Enterprises, Reno, NV (US)

( * ) Notice: Subject to any disclaimer, the term of this patent is extended or adjusted under 35 U.S.C. 154(b) by 193 days.

(21) Appl. No.: 13/835,081

(22) Filed: Mar. 15, 2013

(51) Int. Cl.
A01J 11/00 (2006.01)
A23N 17/00 (2006.01)

(52) U.S. Cl.
CPC .................................. *A23N 17/005* (2013.01)
USPC ............................................ 99/468; 210/603

(58) Field of Classification Search
CPC ............................. A23K 1/003; A23K 17/005
USPC ......... 426/531, 623, 630, 635, 807, 241, 242, 426/285, 465, 476; 99/503, 484, 443, 471, 99/494, 534, 645, 646, 330, 348, 353, 99/355; 210/603, 610, 612–614, 630, 739, 210/741, 743, 744, 103–105, 141, 149, 173, 210/181, 205, 256

See application file for complete search history.

(56) References Cited

U.S. PATENT DOCUMENTS

| | | |
|---|---|---|
| 3,858,505 A | 1/1975 | Lassiter et al. |
| 3,911,808 A | 10/1975 | Lassiter et al. |
| 3,956,980 A | 5/1976 | Lassiter |
| 3,971,306 A | 7/1976 | Wiese et al. |
| 4,074,868 A | 2/1978 | Link |
| 4,150,795 A | 4/1979 | Link |
| 4,262,633 A | 4/1981 | Taboga |
| 5,098,564 A | 3/1992 | Miller et al. |
| 5,269,939 A | 12/1993 | Laurent et al. |
| 5,340,036 A | 8/1994 | Riley |
| 5,352,469 A | 10/1994 | Peters |
| 5,865,113 A | 2/1999 | Weber |
| 5,915,815 A | 6/1999 | Moore et al. |
| 5,976,594 A | 11/1999 | LaFollette |
| 6,059,972 A * | 5/2000 | Mahrer .................... 210/603 |
| 6,534,105 B2 | 3/2003 | Kartchner |

(Continued)

*Primary Examiner* — Henry Yuen
*Assistant Examiner* — Phuong Nguyen
(74) *Attorney, Agent, or Firm* — Gard & Kaslow LLP (57) ABSTRACT

A system for producing secondary food product from primary food product waste is disclosed that comprises several modular subsections: a staging subsystem, a processing subsystem, a drying subsystem, and a pelletization subsystem. Each subsystem, and the connections between subsystems, are sealed such that the food product being processed is isolated from the general environment. Product is dried by the dryer in such a way that it emerges from the dryer at a desired moisture content level and at ambient temperature. A moisture sensor may provide control data to a controller that in turn controls product throughput to obtain a desired moisture content level. High nutritional content and long lifespan of the processed product can be maintained, while reducing the weight of the final product. One or more of the subsystems may be portable and configured for convenient connection and disconnection to mating subsystems, and to facilitate permitting for portable operation.

21 Claims, 4 Drawing Sheets

(56) References Cited

U.S. PATENT DOCUMENTS

| | | |
|---|---|---|
| 6,635,297 B2 | 10/2003 | Moss et al. |
| 7,041,215 B2 | 5/2006 | Lee |
| 7,883,040 B2 | 2/2011 | Lee et al. |
| 8,151,482 B2 | 4/2012 | Moss et al. |
| 8,152,084 B2 | 4/2012 | Lee et al. |
| 2004/0086627 A1 | 5/2004 | Moss |
| 2005/0274035 A1 | 12/2005 | Beal et al. |
| 2011/0281003 A1 | 11/2011 | Alruqaie |

\* cited by examiner

SYSTEM FOR PROCESSING PRIMARY FOOD PRODUCT WASTE INTO SECONDARY FOOD PRODUCT

BACKGROUND

The present disclosure is related to recycling of waste food product, and more specifically to processes and systems for converting primary food product waste into secondary food product such as animal feed.

Foods produced for human consumption are referred to herein as primary food products. Many facilities such as restaurants, cafeterias at businesses and schools, food production and processing plants, and the like collect and dispose of unused and unconsumed primary food product. Examples include table scraps, unconsumed foods, trimmings from food preparation, blemished foods, etc. This unused and unconsumed primary food product is referred to herein as waste. A waste processing service is often paid to haul this waste and dispose of it, such as in a landfill.

Some efforts have been made to recycle and reuse portions of primary food product waste. Methods and systems are known for extraction of metals and plastics from food waste product that can be recycled and reused. Methods and systems are known for producing compost and fuel from the organic constituents of food waste. And most germane to the present disclosure, methods and systems are known for producing animal feed from primary food product waste. This material produced for feed use is referred to herein as secondary food product.

It is well recognized that production of animal feed from primary food product waste must be an economical and scalable process for there to be a justifiable investment in production equipment and infrastructure. There are also known technical requirements for the systems and processes for converting the primary food product waste into secondary food product. The relative difficulty and cost of addressing these requirements is in part a function of the type and diversity of primary food products from which the waste is derived, and in part a function of the type, state, and intended consumer of the target secondary food product. These requirements include production of a sufficiently dry material that decomposition and spoilage is addressed, while not so dry that important nutrients are lost. Non-food and potentially dangerous materials must be reliably removed from the primary food product waste so as not to render the secondary food product safe for consumption. Product must be produced under established standards of cleanliness and care both for the benefit of the animals consuming the secondary food product, whether domestic pets or commercial stock, and for the benefit of neighbors of the production facility, addressing issues such as odor, noise, flies and other vectors, and so on.

In additional to the practical and economic requirements for production of secondary food product from primary food product waste, four federal agencies are responsible for regulating secondary food production when used as feed and pet food: the U.S. Food and Drug Administration (FDA), the U.S. Department of Agriculture (USDA), the U.S. Environmental protection Agency (EPA), and the U.S. Department of Transportation (DOT). Each agency promulgates regulations governing the collection, storing, and handling of food waste, and production and transportation of secondary food product.

To date, however, known systems and processes for producing secondary food product from primary food product waste have fallen short of effectively and efficiently addressing all needs. In certain examples, the cost of production, whether attributed to hauling, processing, or delivering feeds exceeds the return from using or producing the secondary food product. In other examples, the systems or processes the technical requirements have proved insurmountable. And in other examples, regulatory requirements cannot be met. Accordingly, there is a need in the art of an efficient and effective system and process for producing secondary food product from primary food product waste that addresses the shortfalls identified above, and others.

SUMMARY

Accordingly, the present disclosure is directed to systems and processes for providing secondary food product from primary food product waste in an efficient and hygienic fashion, capable of maintaining nutritional value and quality in the secondary food product.

According to various aspects of the present disclosure, a system for producing a secondary food product from a primary food product waste comprises: a primary food product waste staging subsystem; a primary food product waste processing subsystem comprising a pre-processing subsystem, coupled to the staging subsystem in a sealed fashion, for receipt of primary food product waste therefrom, configured for removal of inorganic material from the primary food product waste; a mill subsystem, coupled to the pre-processing subsystem in a sealed fashion, for receipt of primary food product waste therefrom, configured to mill the primary food product waste to a selected constituent size; a press subsystem, coupled to the mill subsystem in a sealed fashion, configured to separate the milled or shredded primary food product liquid constituents, foreign solid constituents and residue, and target material constituents; a transfer subsystem for transferring the separated liquid constituents, foreign solid constituents and residue, and target material constituents to respective storage containers in a sealed fashion; a dryer subsystem comprising a first screw auger transfer and working element having an auger heating element disposed therein and substantially along the length thereof; a housing having an input port and an output port, the housing enclosing the first screw auger transfer and working element, the housing configured to provide and sustain a vacuum therein such that the screw auger transfer and working element may transfer and work product within the housing under a vacuum pressure; a heating element extending substantially the length of the screw auger transfer and working element, disposed and configured to impart thermal energy to the housing and in turn to product being transferred and worked with the housing; a motor coupled to the screw auger transfer and working element for rotating the screw auger transfer and working element; a controller, coupled to the motor, for controlling the speed of the motor, and for ultimately controlling rotational speed of the screw auger transfer and working elements, wherein rotation speed of the motor is controlled to complete production of secondary food product from the primary food product waste by obtaining secondary food product from the screw auger transfer and working elements having a desired moisture content; and a delivery subsystem for receiving the secondary food product having a desired moisture content from the screw auger transfer and working element in a sealed fashion, and retaining the product for further processing or distribution. One or more of the subsystems may be configured to be readily mobile and relatively rapidly disassembled and assembled for transport and remote operation.

Implementations of this aspect may also include a second screw auger transfer and working element communicatively connected to the first screw auger transfer and working element in a sealed and sequential fashion. The second screw auger transfer and working element may have an auger heating element disposed therein and substantially along the length thereof and communicatively connected to the heating element disposed within the first screw auger transfer and working element.

Still further implementations may include a moisture sensor disposed and configured for sensing moisture content of product being transferred and worked with the housing at a selected location. The controller may be coupled to the moisture sensor and the motor, for controlling the speed of the motor, and for ultimately controlling rotational speed of the screw auger transfer and working element, in part in response to the moisture content sensed by said moisture sensor.

Additional implementations may include some or all of: a magnetic subsystem and a screening subsystem for removing oversized and inorganic material, including ferromagnetic material, from said primary food product waste; a metal sensing subsystem for identifying metal constituents that are not otherwise identified by said magnetic and screening subsystems; a vapor capture subsystem communicatively coupled to said housing and configured such that vapor produced by drying product being transported and worked within said housing is condensed and collected.

In still further implementations the auger heating element may comprise a generally hollow central shaft around which pitch-cut flighting rotates, the generally hollow central shaft configured to receive heated fluid to heat the screw auger transfer and working elements and thereby heat product being transferred and worked thereby.

The above is a brief summary of a number of unique aspects, features, and advantages of the present disclosure. The above summary is provided to introduce the context and certain concepts relevant to the full description that follows. However, this summary is not exhaustive. The above summary is not intended to be nor should it be read as an exclusive identification of aspects, features, or advantages of the claimed subject matter. Therefore, the above summary should not be read as imparting limitations to the claims nor in any other way determining the scope of said claims.

BRIEF DESCRIPTION OF THE DRAWINGS

In the drawings appended hereto like reference numerals denote like elements between the various drawings. While illustrative, the drawings are not drawn to scale. In the drawings.

DETAILED DESCRIPTION

We initially point out that description of well-known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details.

Figure 1:
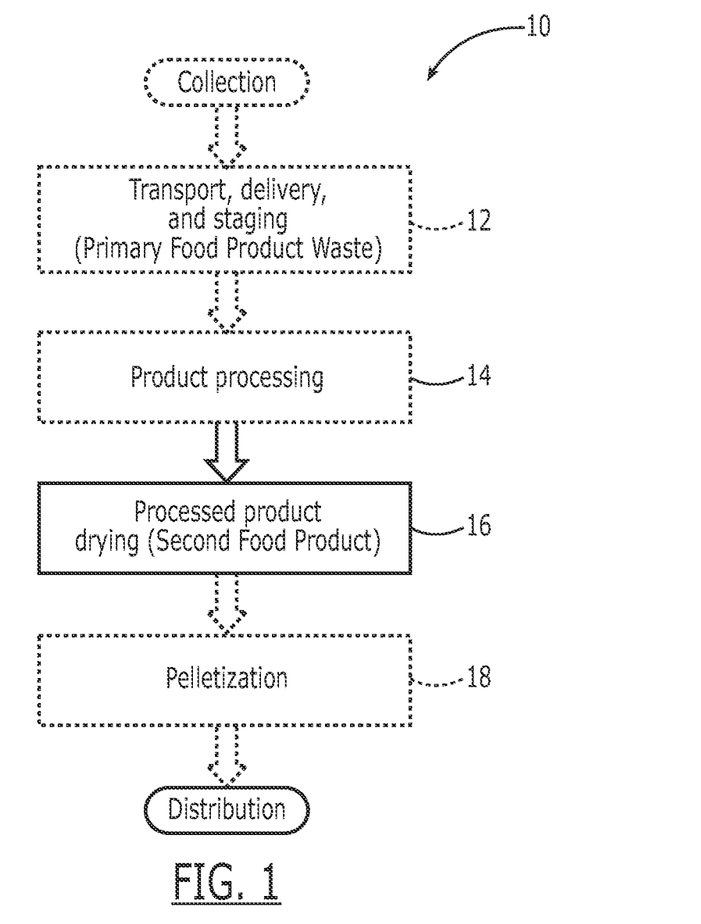
FIG. 1 is a generalized flow chart illustrating the elements and operating steps of a system for processing primary food product waste into secondary food product according to various embodiments disclosed herein.

With reference to FIG. 1, shown therein is a block diagram of a system and 10, as associated method, for receiving primary food product waste and producing therefrom secondary food product. System 10 is comprised of several subsystems including transport, delivery, and staging subsystem 12, product processing subsystem 14, processed product drying subsystem 16, and pelletization subsystem 18. Each subsystem is described further below.

Primary food product waste may comprise unconsumed foods produced for human consumption. Primary food product waste may be collected from facilities such as restaurants, cafeterias at businesses and schools, food production and processing plants, and the like, such as by waste haulers, recyclers, and others. Examples include table scraps, unconsumed foods, trimmings from food preparation, blemished foods, etc. The primary food product waste may be collected in large containers that may be transported to a processing facility, emptied on-site into a transport vehicle (e.g., a waste collection truck), and so on. In one embodiment, the primary food product waste is collected on site and emptied into a special transport vehicle capable of effectively keeping the waste product separated from the general environment in order to keep odor to a minimum, minimize attraction of insect, rodents, and other vectors, and in order to minimize contamination of the primary food product waste during transport. Partial processing of the primary food product waste may also take place within the transport vehicle in transit between collection and delivery of the primary food waste product to a processing site. See U.S. patent application Ser. No. 13/835,814, titled "Collection And Processing Container Configured For Removable Disposition Within A Refuse Collection Vehicle", incorporated by reference herein. The delivered primary food product waste may be staged at the processing site for further processing. The transport, delivery, and staging of primary food product waste is shown as a single step for the purpose of one embodiment disclosed herein and discussed in further detail below. However, one or more of these steps may be performed by separate entities, with separate equipment, as will be understood by one skilled in the art. Therefore, the illustration of these component steps as a single step and a single subsystem in FIG. 1 is for illustration only and does not limit the scope of the present disclosure.

Furthermore, transportation, delivery, and staging subsystem 12 is shown in dashed outline to indicate that it is an optional subsystem. According to certain embodiments, some or all of the elements or steps described may be omitted, or alternate embodiments or steps substituted therefore while accomplishing similar results. Indeed, in general, elements or steps shown in dashed outline are to be understood as optional, and present in certain embodiments and not present in whole or in part in others.

Upon delivery to a processing site, the primary food product waste may be processed by product processing subsystem 14 to produce intermediate product. For example, the primary food product waste may be screened and filtered to remove inorganic material, potentially harmful material, to produce intermediate product of a specified granular size and consistency, and so on. In certain applications, product processing subsystem may comprise few or lesser elements, depending for example of the content and quality of the primary food product waste. Exemplary elements of product processing subsystem 14 are described below. In certain embodiments, primary food product waste is processed and/or transported from transport, delivery, and staging subsystem 12 to product processing subsystem 14 isolated from the general environment in order to keep odor to a minimum, minimize attraction of insect, rodents, and other vectors, and in order to minimize contamination of the primary food product waste. In additional to practical considerations, in certain embodiments this transport of food product isolated from the general environment is required by permit or assists with meeting other regulatory requirements for waste product processing.

Primary food product processed by product processing subsystem 14 is provided to product drying subsystem 16 where the moisture content of the primary food product is adjusted to a desired level. Drying subsystem 16 is described further below. See also U.S. patent application Ser. No. 13/835,396, titled "Systems and Methods for Drying Processed Food Product", incorporated herein by reference. There are multiple motivations for controlling the moisture content of the processed food product, including but not limited to: maximizing the nutritional content per weight of the food product, maximizing lifespan of the food product by controlling the likelihood of contamination and spoilage, controlling the consistency of the processed food product for pelletization, minimizing weight of the food product to minimize transportation cost, minimizing dust and airborne product particles, and so on. At this point, the primary food product waste has been converted into secondary food product. Once again, the processed food product is dried and/or transported to pelletization subsystem 18 isolated from the general environment for the reasons discussed previously.

The physical form and dimension of the secondary food product may be controlled by pelletization subsystem 18. While pellets are one convenient form factor of the final state of the secondary food product, other form factors are contemplated herein including but not limited to: granules, rings, ribbons, chips, and so on. Reference to pellets and pelletization is therefore merely by way of example. Secondary food product exiting processed product drier subsystem 16 may be stored prior to pelletization, or may be delivery directly to pelletization subsystem 18 as produced for sequential production into a desired form factor. For this reason, pelletization subsystem 18 is shown as optional in dashed outline in FIG. 1.

Figure 2:
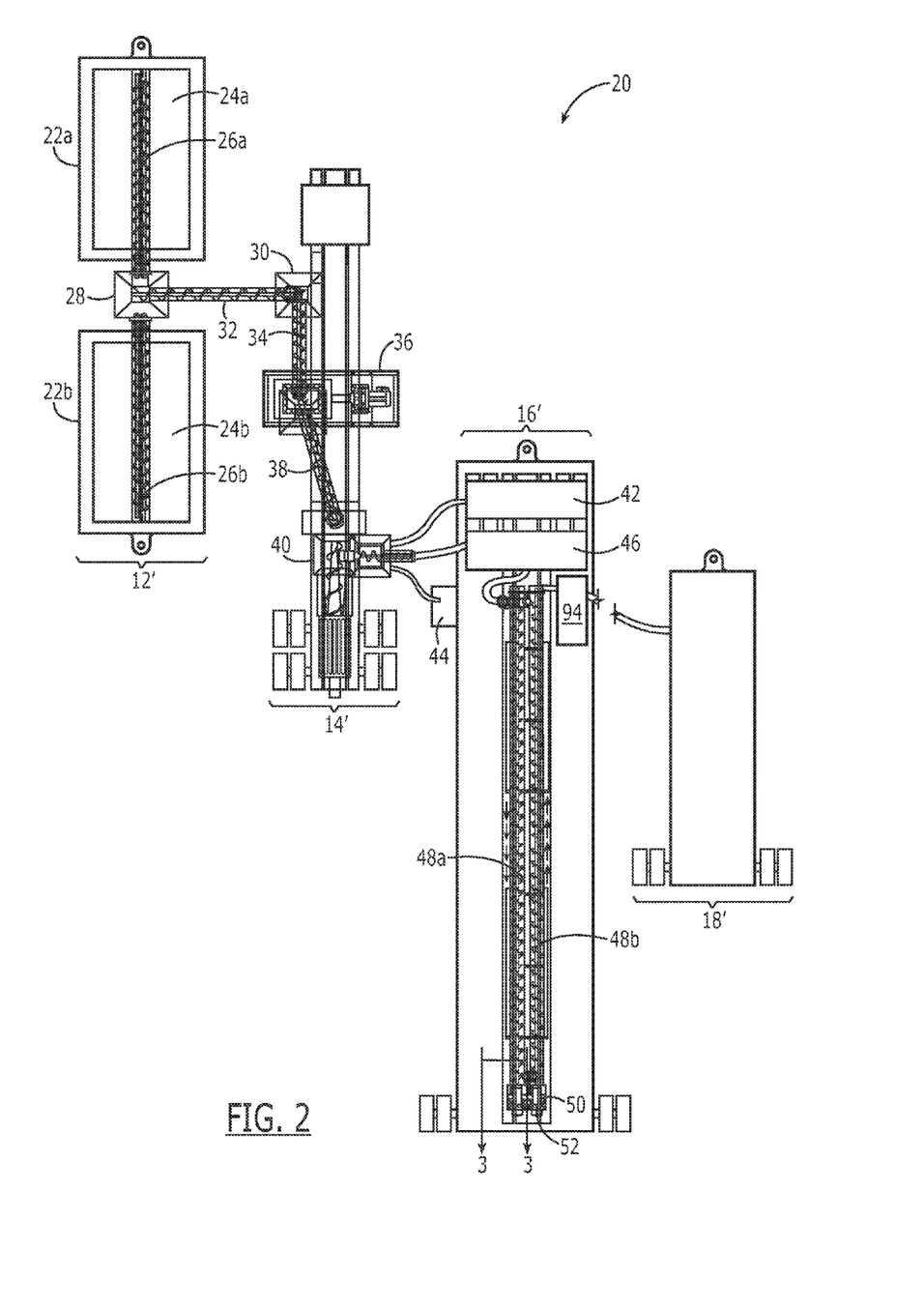
FIG. 2 is a plan view of an exemplary system for processing primary food product waste into secondary food product according to one embodiment disclosed herein.

With reference to FIG. 2, there is shown therein a system 20 for processing primary food product waste into secondary food product according to one exemplary embodiment. While specific subsystems and elements thereof are described with respect to the embodiment shown in FIG. 2, it will be understood that this embodiment is provided for illustration and does not, simply by it presentation herein, limit the scope of the present disclosure. System 20 comprises a plurality of mobile subsystems. While shown as mobile, one or more of the subsystem illustrated in FIG. 2 may be partially or primarily stationary. The subsystems illustrated in FIG. 2 roughly correspond to the subsystems described with respect to FIG. 1. For this reason, subsystems of the embodiment shown in FIG. 2 performing functions analogous to those described with respect to FIG. 1 are assigned the same element number, with a prime symbol (') appended to indicate they are an element of the embodiment shown in FIG. 2.

Transport, delivery, and staging subsystem 12' comprises a plurality of platforms 22a, 22b, etc. Platforms 22a, 22b are configured to receive transport pods 24a, 24b, etc. Pods 24a, 24b, etc., which each are configured to be removably carried by a transport vehicle, such as a refuse collection truck. The structure and operation of pods 24a, 24b, etc. is beyond the scope of the present disclosure. See the aforementioned U.S. patent application Ser. No. 13/835,814. For reasons of efficiency, platforms 22a, 22b, etc. are arranged such that a truck may deliver a pod, for example pod 24a, that contains primary food product waste and pick up an emptied pod, for example pod 24b, while the overall system continuously processes delivered primary food product waste.

Pods 24a, 24b may be configured to mate to a receiving port in system 20 such that primary food product waste may be delivered in a sealed fashion, isolated from the general environment, for example by screw-auger system 26a, from pod 24a to hopper 28, and from hopper 28 to hopper 30. Hoppers 28, 30 both stage the primary food product waste for further processing and perform certain preprocessing of the primary food product waste. For example, hopper 28 (or 30, or both) may be provided with one or more electromagnets and a magnet cleaning subsystem configured for removal of metallic components of the primary food product waste, for example, errant metal cutlery or serving containers, etc. Hopper 28 (or 30, or both) may be provided with a metal detection subsystem to identify non-ferromagnetic metal components of the primary food product waste, for removal by alternative means such as manually, agitation and filtering, etc. Similar filtering can be used to identify and remove other non-metallic inorganic elements from the primary food product waste, such as plastic cutlery, wrapping and containers, and so on. In certain embodiments, system 20 is closed and the food product isolated from the general environment for reasons stated above. Therefore, manual picking of non-food elements from the primary food product waste may generally not be practicable, or must occur prior to the food product entering the system, such as at point of collection. In other embodiments, a limited intra-system opportunity for picking may be provided.

Conveyers 32, 34, such as screw augers, conveyor belts, etc. transport the primary food product waste between hopper 28 and hopper 30, and from hopper 30 to a hammermill 36, respectively. Hammermill 36 mills (e.g., shreds and crushes) the primary food product waste into a desired constituent size. The shredded crushed primary food product waste is transported by conveyor 38 to screw press 40. Screw press 40 extracts and separates liquid constituents (e.g., water), foreign solids and residue, and target product. A transfer subsystem is provided such that liquid constituents are transferred to holding tank 42 (for later filtering, treatment, and recycling), and foreign solids and residue are transferred to holding tank 44 (for later filtering, treatment, recycling, and disposal). Target product is transferred to a holding tank 46 for staging prior to introduction into product dryer 16'. At this stage, target product in holding tank 46 is at least in significant part moist, organic material having nutritional value.

The target material in holding tank 46 is then transferred to product dryer 16', for example by way of a progressive cavity pump. Dryer 16' is configured to reduce the moisture content of the target material to a selected level for a number of reasons, including but not limited to minimizing spoilage of the secondary food product over relatively long transport and storage times. The dried product may be safely handled and agglomerates for ease of handling and storage.

Dryer 16' dries the target material under vacuum between input port and output port. There are a variety of motivations drying under vacuum. One motivation is to lower the effective boiling point within dryer 16' such that moisture may be removed (evaporated) safely below temperatures at which the primary food product waste might burn or otherwise be overheated. Other reasons include minimizing emissions, potentially eliminating the need for emissions permitting and permitting indoor operation of the system, and so on.

Heating of the primary food product waste causes water contained therein to turn to water vapor. This water vapor is carried away from the primary food product being dried, for example by vents, double walled channels in which the product is retained, or other mechanism. The water vapor may then be condensed into water that is captured by dryer 16', and useable for various purposes, including but not limited to cooling sections of the dryer, cleaning sections of the dryer (before, during or after processing, automatically or manually), etc.

Dryer 16' gradually and progressively dries the target material such that nutrients are retained in the dried product, permitting the secondary food product to be economically and nutritionally useful as animal feed, pet food ingredient, etc. Product temperature is maintained at or below a critical temperature such that proteins in the food product remain intact and the food product is preserved, and scorching or burning of the food product is avoided. In one example, the processing temperature within dryer 16' remains below 212° F. However, the critical temperature may vary, and is in part a function of the type of food product waste.

In one embodiment, food product waste dryer subsystem 16' is configured to provide a progressive vacuum dehydration system. The vacuum decreases atmospheric pressure in a series of chambers, each separated by an airlock (e.g., butterfly valve). A progressive vacuum system may facilitate a staged lowering along the length of the dryer of the boiling point of the food product waste being dried, which provides a desired profile (e.g., rate of water extraction) of drying of the product along the length of the dryer, and may account for progressively reduced water content in the product along the length of the dryer. However, in other embodiments, the vacuum may be substantially uniform along the length of the dryer.

In the example of FIG. 2, screw-type auger assemblies 48a, 48b, act as conveyers to move product along the length of a tubular housing. In one embodiment, a full lineal length of dryer assembly may be on the order of 40-feet. In certain embodiments, such as transportable drying assemblies, the lineal length may connected in sequential fashion, effectively as a folded path, such as constructing the dryer from two 20-foot long sections 48a, 48b, with a flanged, bolted u-connection 50 at a distal end that mates to an end flange of each subassembly. A hanger bearing support 52 is provided for access to a center hanger bearing for maintenance and for assembly and disassembly of the auger-to-auger connection. In certain embodiments, sections of the length of the dryer assembly may be oriented horizontally adjacent one another, vertically one above another, or such as with three or more sections, may be both horizontally and vertically arrayed. The specifics of the layout of a dryer and elements thereof will vary from one implementation to another, and the above is simply by way of example.

Figure 3:
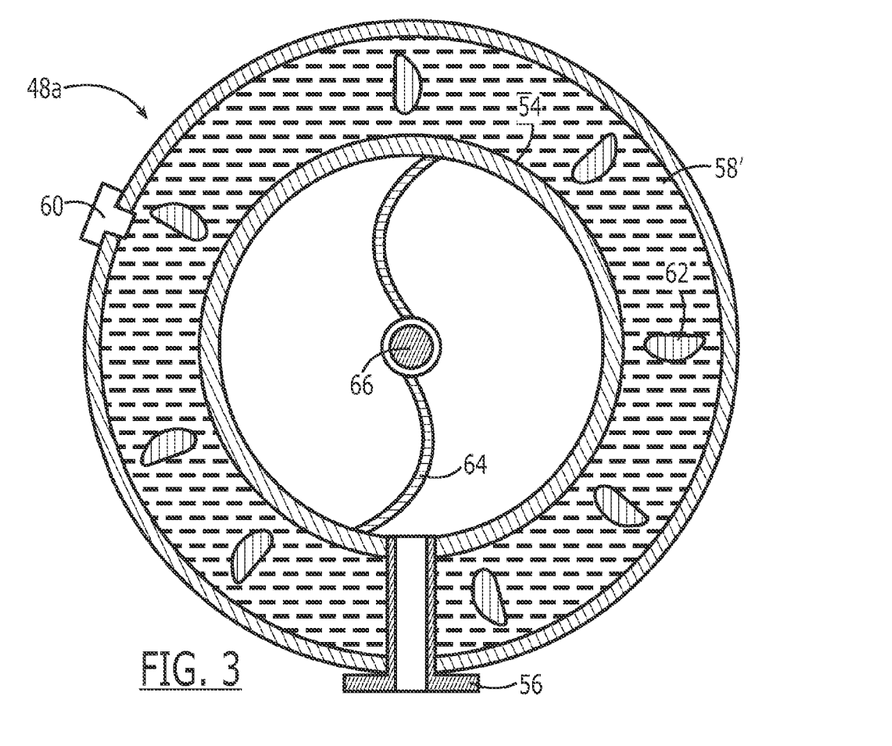
FIG. 3 is a cross-section view of a section of housing and screw auger for transporting and working product under vacuum and elevated temperature having a heating jacket thereover, according to an embodiment disclosed herein.

One screw-type auger assembly 48a is shown in cross-sectional view in FIG. 3. Assembly 48a comprises a housing 54 constructed for example of stainless steel pipe with a polished interior surface. Each housing also includes a flanged pipe stub 56 for connection to a vacuum manifold.

Surrounding conveyor housing 54 is a hot oil jacket 58 that may extend along at least the majority of housing 54. Jacket 58 includes couplings for oil inlet and oil outlet (not shown) and a coupling 60 for a temperature sensor. Jacket 58 include internal baffles 62 providing an even temperature around the radius of the conveyor housing by insuring that oil flows uniformly thereover. Alternatively, housing 58 may be configured to include channels for heated oil or other heating material, or provided with other heating mechanisms such as resistive heating filaments, chemical reactive heating, radiant heating, etc.

Figure 5:
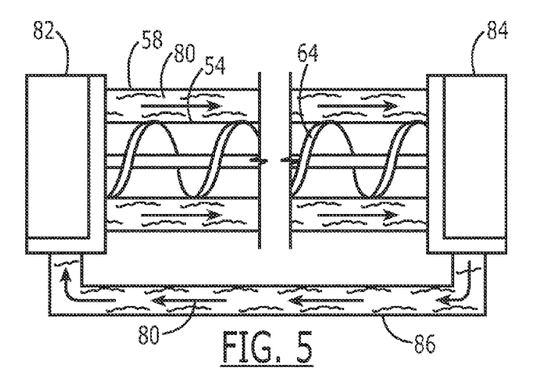
FIG. 5 is a cut-away view of a heating jacket, rotary couplings, and manifold for providing heated oil to heat food product during processing according to an embodiment disclosed herein.

As shown in FIG. 5, hot oil 80 enters one end of jacket 58 through a first rotary coupling 82, passes through length of jacket 58, and out the other end of jacket 58 through a second rotary coupling 84. The oil then enters an oil return manifold 86. Manifold 86 may be constructed, for example, of stainless steel pipe. This manifold may be mounted to a support frame at one end of the dryer subsystem 16' and feeds oil onto both the auger rotary union and into the auger housing jacket Returning to FIG. 3, disposed within housing 54 is a screw-type auger 64. Auger 64 includes pitch-cut-style flighting to allow for vapor removal. For longer sections of housing, the outside diameter of the flighting may be tapered to a smaller diameter in the center of the length of the auger to allow for sagging within housing. In one embodiment, auger 64 includes a hollow central shaft 66, configured to allow for hot oil to flow therethrough. This permits the auger to heat the product as it is being worked and transported within the heater. This heating, in conjunction with heating by jacket 58, speeds the drying of product within dryer 16. In one example, housing 54 and auger 64 are configured to convey 3000 pounds per hour of pulverized primary food product waste with a bulk density of approximately 65 pounds per cubic foot through the entire length (e.g., 40 feet) of dryer subsystem 16'.

Auger 64 simultaneously moves and works (and in some embodiments, heats) the target product over the uniformly heated inside surface area of the jacketed housing 54 at a pressure and temperature combination that flashes liquid within the target product to vapor, effectively drying the product. Dryness of the product may be monitored and the system parameters such as heat, processing speed, vacuum level, etc. controlled such that a target product dryness is achieved.

Figure 4:
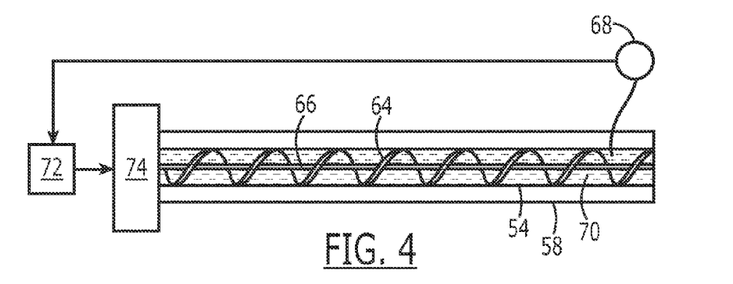
FIG. 4 is a schematic view of a temperature control feedback arrangement for obtaining secondary food product at a desired moisture content level according to an embodiment disclosed herein.

One embodiment of a dryer with a feedback loop moisture sensor is illustrated in FIG. 4. A moisture sensor 68 may be disposed with a sensor probe within housing 54, or alternatively at the output of housing 54, to measure the moisture of target product 70 at a selected position. A controller 72 receives the moisture measurement from sensor 68, and variably controls the speed of motor 74, thereby controlling the speed of the movement of the target product through the system. Other aspects of system operation may also be controlled by a similar controller and feedback loop. Drying to the desired moisture level may thereby be controlled.

Auger assemblies 48a, 48b are isolated from the general environment for noise reduction, temperature isolation, control of odor, and so on. The entire auger housing (including center hanger bearing flanges) may be covered with insulating material, such as removable sections of hydrophobic Thermaxx Teflon/fiberglass and Pyrogel XT aerogel insulation (Thermaxx Inc. Fremont, Calif.).

In certain applications, some or all of the elements of system 20 may be transportable, or mobile, for example on the flatbed trailer of a semi-trailer truck. Elements of the system are specifically sized and configured to permit convenient and safe transport of the system, and certain elements of the system are configured for relatively rapid and easy disassembly and reassembly during transport. A minimum number of interconnections between subsystems, quick-disconnect/quick-connect fittings, and sealed connection ports during transport are examples of such configurations.

Figure 6:
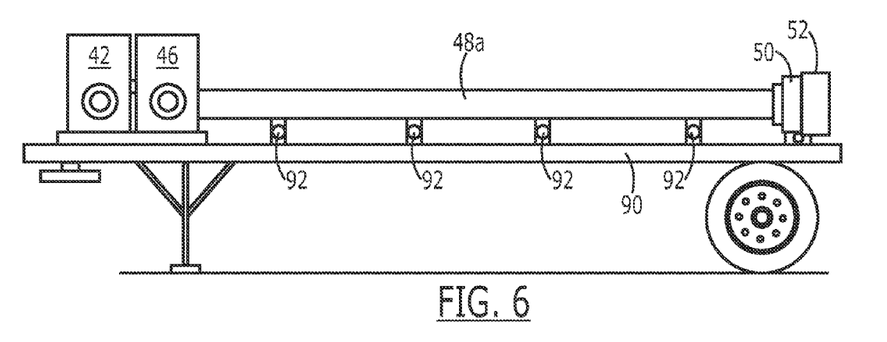
FIG. 6 is side view of flatbed having a dryer of a type disclosed herein according one exemplary embodiment.

Accordingly, a mobile arrangement of dryer subsystem 16' is shown in elevation view in FIG. 6, in which previously described elements are mounted to flatbed 90. Due to the close clearances required between auger and housing, it is important to permit leveling and alignment of the housings, particularly in mobile applications. Jacketed housings may be configured to "float" on flatbed 90 (or frame) to allow for thermal expansion occurring during operation of the system. Accordingly, adjustable vertical and horizontal connection pads 92 are provided on the frame members supporting the jacketed housings. Any connections between discrete mobile (or stationary) subsystems and conveyers are configured to allow the conveyors to maintain alignment during operation.

Returning to FIG. 2, a dry product delivery subsystem is providing comprising a drop out chamber 94 for intermediate holding of the dried secondary food product. Optionally, chamber 94 includes a vacuum maintenance mechanism (such as pneumatically actuated butterfly valves at the inlet and outlet of the chamber). A high- and low-level sensor(s) is also provided internal to chamber 94. Chamber 94 will be located proximate (e.g., adjacent or below) the discharge of the final stage drying assembly. During operation the valve on the inlet side will remain open while the valve on the outlet side will remain closed. When the level sensor signals that the product level has reached a fill point, the inlet valve will close to maintain vacuum in the system and the outlet valve will open to discharge product, for example to an external hold vessel, further processing apparatus, pelletization subsystem 18', etc. Once the product level has triggered the low level sensor, the discharge valve closes and the inlet valve opens to allow product to begin to flow into the chamber without opening the vacuum system to the environment.

At this point the secondary food product has a desired dryness, and while in a relatively bulk format may be utilized as is. Alternatively, the secondary food product may be transferred to a subsystem 18' for converting the secondary food product from a bulk format to a morsel format. While pellets are one convenient morsel form factor, other form factors are contemplated herein including but not limited to: granules, rings, ribbons, chips, and so on. Reference to pellets and pelletization is therefore merely by way of example. According to one embodiment, secondary food product is provided from chamber 94 to a pelletizing subsystem 18', isolated from the general environment for the reasons discussed previously. In one embodiment, pelletization subsystem 18' comprises an Insta-Pro International model 2000-series extruder (Insta-Pro International, Urbandale, Iowa). In such an embodiment, secondary food product is dried, by dryer subsystem 16' to 10-20% moisture content, then extruded and cut to generate a finished dried meal or a pellet. The size, shape, color, etc. of the pellet may be selected to suit end use of the product. According to this embodiment, the high shear extruder generates heat through friction to accomplish numerous processes—cooking, expansion, sterilizing, dehydrating and texturizing. The temperatures and pressures created in the extrusion process allow for a HTST (High Temperature, Short Time) process resulting in quality nutritional feed and food. It will be appreciated by one skilled in the art that a variety of different extruder or pellet machines can be utilized. However, the Insta-Pro International model 2000-series extruder is one model that specifically meets USDA/FDA guidelines for acceptable heat treated by-products for the feeding, for example, of swine.

The realities of modern mechanical and electrical devices and the methods of their production are not absolutes, but rather statistical efforts to produce a desired device and/or result. Even with the utmost of attention being paid to repeatability of processes, the cleanliness of manufacturing facilities, the accuracy of manufacturing tools, the purity of starting and processing materials, and so forth, variations and imperfections result. Accordingly, no limitation in the description of the present disclosure or its claims can or should be read as absolute. The limitations of the claims are intended to define the boundaries of the present disclosure, up to and including those limitations. To further highlight this, the term "substantially" may occasionally be used herein in association with a claim limitation (although consideration for variations and imperfections is not restricted to only those limitations used with that term). While as difficult to precisely define as the limitations of the present disclosure themselves, we intend that this term be interpreted as "to a large extent", "as nearly as practicable", "within technical limitations", and the like.

While examples and variations have been presented in the foregoing description, it should be understood that a vast number of variations exist, and these examples are merely representative, and are not intended to limit the scope, applicability or configuration of the disclosure in any way. Various of the above-disclosed and other features and functions, or alternative thereof, may be desirably combined into many other different systems or applications. Various presently unforeseen or unanticipated alternatives, modifications variations, or improvements therein or thereon may be subsequently made by those skilled in the art which are also intended to be encompassed by the claims, below.

Therefore, the foregoing description provides those of ordinary skill in the art with a convenient guide for implementation of the disclosure, and contemplates that various changes in the functions and arrangements of the described examples may be made without departing from the spirit and scope of the disclosure defined by the claims thereto.

What is claimed is:

1. A system for producing a secondary food product from a primary food product waste, comprising:
    a primary food product waste staging subsystem;
    a primary food product waste processing subsystem, said processing subsystem comprising;
        a pre-processing subsystem, coupled to said staging subsystem in a sealed fashion, for receipt of primary food product waste therefrom, configured for removal of inorganic material from the primary food product waste;
        a mill subsystem, coupled to said pre-processing subsystem in a sealed fashion, for receipt of primary food product waste therefrom, configured to mill the primary food product waste to a selected constituent size;
        a press subsystem, coupled to said mill subsystem in a sealed fashion, configured to separate the milled or shredded primary food product liquid constituents, foreign solid constituents and residue, and target material constituents;
        a transfer subsystem for transferring said separated liquid constituents, foreign solid constituents and residue, and target material constituents to respective storage containers in a sealed fashion;
    a dryer subsystem comprising:
        a first screw auger transfer and working element having an auger heating element disposed therein and substantially along the length thereof;

a housing having an input port and an output port, said housing enclosing said first screw auger transfer and working element, said housing configured to provide and sustain a vacuum therein such that said screw auger transfer and working element may transfer and work product within said housing under a vacuum pressure;

a heating element extending substantially the length of said screw auger transfer and working element, disposed and configured to impart thermal energy to said housing and in turn to product being transferred and worked with said housing;

a motor coupled to said screw auger transfer and working element for rotating said screw auger transfer and working element;

a controller, coupled to said motor, for controlling the speed of said motor, and for ultimately controlling rotational speed of said screw auger transfer and working elements, wherein rotation speed of said motor is controlled to complete production of secondary food product from said primary food product waste by obtaining secondary food product from said screw auger transfer and working elements having a desired moisture content; and a delivery subsystem for receiving said secondary food product having a desired moisture content from said screw auger transfer and working element in a sealed fashion, and retaining said product for further processing or distribution.

2. The system of claim 1, further comprising a second screw auger transfer and working element communicatively connected to said first screw auger transfer and working element in a sealed and sequential fashion, said second screw auger transfer and working element having an auger heating element disposed therein and substantially along the length thereof and communicatively connected to said heating element disposed within said first screw auger transfer and working element.

3. The system of claim 1, further comprising:
a moisture sensor disposed and configured for sensing moisture content of product being transferred and worked within said housing at a selected location; and
said controller coupled to said moisture sensor and said motor, for controlling the speed of said motor, and for ultimately controlling rotational speed of said screw auger transfer and working element, in part in response to the moisture content sensed by said moisture sensor.

4. The system of claim 1, wherein said pre-processing subsystem comprises a magnetic subsystem and a screening subsystem for removing oversized and inorganic material, including ferromagnetic material, from said primary food product waste.

5. The system of claim 4, where said pre-processing subsystem further comprises a metal sensing subsystem for identifying metal constituents that are not otherwise identified by said magnetic and screening subsystems.

6. The system of claim 1, further comprising a vapor capture subsystem communicatively coupled to said housing and configured such that vapor produced by drying product being transported and worked within said housing is condensed and collected.

7. The system of claim 1, wherein said housing is configured to provide a desired vacuum pressure profile along the length of said housing from input port to output port.

8. The system of claim 7, wherein said vacuum pressure profile is of a form such that an ambient pressure is provide at the input port with pressure decreasing to an inflection position before said output port, and with pressure increasing from said inflection position to said output port such that product being transferred and worked within said housing exits said output port at ambient pressure.

9. The system of claim 8, wherein said pressure profile includes pressure discontinuities along the length of said housing.

10. The system of claim 1, wherein said heating element is configured to provide a desired temperature profile along the length of the housing from input port to output port.

11. The system of claim 10, wherein said temperature profile is of a form such that an ambient temperature is provide at the input port with temperature increasing to an inflection position before said output port, and with temperature decreasing from said inflection position to said output port such that product being transferred and worked within said housing exits said output port at ambient temperature.

12. The system of claim 1, wherein said auger heating element comprises a generally hollow central shaft around which pitch-cut flighting rotates, said generally hollow central shaft configured to receive heated fluid to heat said first screw auger transfer and working element and thereby heat product being transferred and worked thereby.

13. The system of claim 1, wherein at least one of said primary food product waste staging subsystem, said primary food product waste processing subsystem, and said dryer subsystem are specifically configured to be a mobile subsystem that at least partially disassembles for transport, further comprising elements for facilitating relatively rapid disassembly and reassembly and sealing of subsystems from the general environment external of said housing during transport.

14. The system of claim 13, wherein said primary food product waste processing subsystem and said dryer subsystem are each mobile subsystems and are each further disposed on a separate flatbed for separate transport, and further comprising leveling and alignment mechanisms adjustably securing said primary food product waste processing subsystem and said dryer subsystem to said respective flatbed.

15. The system of claim 1, further comprising a pelletization subsystem communicatively connected to said delivery subsystem such that secondary food product may be provided to said pelletization subsystem from said delivery subsystem and pelletized.

16. The system of claim 1, wherein each of said primary food product waste staging subsystem, said primary food product waste processing subsystem, and said dryer subsystem are specifically configured for production of feed selected from the group consisting of: animal feed, domestic pet feed.

17. The system of claim 1, wherein said delivery subsystem comprises a sealed chamber and pressure control valves to isolate an internal portion of said housing that is under vacuum pressure from the general environment external of said housing.

18. The system of claim 17, wherein said delivery subsystem further comprises level sensors for sensing the level of secondary food product within said delivery subsystem and configured such that when said sensors sense that secondary food product reaches a desired level within said delivery subsystem an internal valve subsystem closes to isolate said internal portion of said housing that is under vacuum pressure from said environment and permit emptying of secondary food product from within said delivery subsystem substantially without altering the vacuum pressure of said internal portion of said housing.

19. The system of claim 1, wherein said primary food product waste staging subsystem comprises a pre-processing vehicle section, said section comprising:
- a main collection section;
- a separated liquid collection section;
- a liquid separation mechanism coupled to said main collection sections and said separated liquid collection section such that said liquid separation mechanism may pre-process primary food product waste to separate at least some of the liquid therefrom; and
- a primary food product waste transport subsystem communicatively coupled to said primary food product waste processing subsystem for delivery of primary food product waste from said pre-processing vehicle section to said primary food product waste processing subsystem;
- whereby said pre-processing vehicle section is configured for removable disposition on or within a collection vehicle, further configured for pre-processing of primary food product waste to separate at least some of the liquid therefrom while said pre-processing vehicle section is disposed on or within the collection vehicle, and still further configured for delivery of primary food product waste from said pre-processing vehicle section to said primary food product waste processing subsystem while said pre-processing vehicle section is removed from the collection vehicle.

20. A system for producing a secondary food product from a primary food product waste, comprising:
- a primary food product waste staging subsystem;
- a primary food product waste processing subsystem, said processing subsystem comprising;
  - a magnetic and screening subsystem, coupled to said staging subsystem in a sealed fashion, for receipt of primary food product waste therefrom, configured for removal of inorganic and oversized material from the primary food product waste;
  - a mill subsystem, coupled to said magnetic and screening subsystem in a sealed fashion, for receipt of primary food product waste therefrom, configured to mill the primary food product waste to a selected constituent size;
  - a press subsystem, coupled to said mill subsystem in a sealed fashion, configured to separate the milled or shredded primary food product liquid constituents, foreign solid constituents and residue, and target material constituents;
  - a transfer subsystem for transferring said separated liquid constituents, foreign solid constituents and residue, and target material constituents to respective storage containers in a sealed fashion;
- a dryer subsystem comprising:
  - at least two screw auger transfer and working elements, at least a first said screw auger transfer and working element communicatively connected to a second said screw auger transfer and working element in a sealed and sequential fashion, said screw auger transfer and working elements having a heating element disposed therein and substantially along the length thereof;
  - a housing having an input port and an output port, said housing enclosing said screw auger transfer and working elements, said housing configured to provide and sustain a vacuum therein having a vacuum pressure profile varying along the length thereof, such that said screw auger transfer and working elements may transfer and work product within said housing under a vacuum pressure, said vacuum increasing along said length of said housing from a position proximate said input port to a position prior to said output port;
  - a heating element extending substantially the length of said screw auger transfer and working elements, disposed and configured to impart thermal energy to said housing, and in turn to product being transferred and worked with said housing, having a temperature profile varying along the length thereof, said temperature profile is of a form such that an ambient temperature is provide at the input port with temperature increasing to an inflection position before said output port, and with temperature decreasing from said inflection position to said output port such that product being transferred and worked within said housing may exit said output port at ambient temperature;
  - a moisture sensor disposed and configured for sensing moisture content of product being transferred and worked with said housing at a selected location;
  - a motor coupled to said screw auger transfer and working elements for rotating said screw auger transfer and working elements;
  - a controller, coupled to said moisture sensor and said motor, for controlling the speed of said motor, and for ultimately controlling rotational speed of said screw auger transfer and working elements, in part in response to the moisture content sensed by said moisture sensor, wherein rotation speed of said motor is controlled to complete production of secondary food product from said primary food product waste by obtaining secondary food product from said screw auger transfer and working elements having a desired moisture content;
  - a vapor capture subsystem communicatively coupled to said housing and configured such that vapor produced by drying product being transported and worked within said housing is condensed and collected; and
- a delivery subsystem for receiving said secondary food product having a desired moisture content from said screw auger transfer and working element in a sealed fashion, and retaining said product for further processing or distribution.

21. A system for producing a secondary food product from a primary food product waste, comprising:
- a primary food product waste staging subsystem, comprising:
  - a main collection section;
  - a separated liquid collection section;
  - a liquid separation mechanism coupled to said main collection sections and said separated liquid collection section such that said liquid separation mechanism may pre-process primary food product waste to separate at least some of the liquid therefrom; and
  - a primary food product waste transport subsystem for delivery of primary food product waste therefrom;
- a primary food product waste processing subsystem, said processing subsystem comprising;
  - a pre-processing subsystem, coupled to said staging subsystem in a sealed fashion, for receipt of primary food product waste therefrom, configured for removal of inorganic material from the primary food product waste;
  - a mill subsystem, coupled to said pre-processing subsystem in a sealed fashion, for receipt of primary food product waste therefrom, configured to mill the primary food product waste to a selected constituent size;

a press subsystem, coupled to said mill subsystem in a sealed fashion, configured to separate the milled or shredded primary food product liquid constituents, foreign solid constituents and residue, and target material constituents;

a transfer subsystem for transferring said separated liquid constituents, foreign solid constituents and residue, and target material constituents to respective storage containers in a sealed fashion;

a dryer subsystem comprising:

at least two screw auger transfer and working elements, at least a first said screw auger transfer and working element communicatively connected to a second said screw auger transfer and working element in a sealed and sequential fashion, said screw auger transfer and working elements each having an auger heating element disposed therein and substantially along the length thereof;

a housing having an input port and an output port, said housing enclosing said screw auger transfer and working elements, said housing configured to provide and sustain a vacuum therein such that said screw auger transfer and working elements may transfer and work product within said housing under a vacuum pressure;

a heating element extending substantially the length of said screw auger transfer and working elements, disposed and configured to impart thermal energy to said housing and in turn to product being transferred and worked with said housing;

a moisture sensor disposed and configured for sensing moisture content of product being transferred and worked with said housing at a selected location;

a motor coupled to said screw auger transfer and working elements for rotating said screw auger transfer and working elements;

a controller, coupled to said moisture sensor and said motor, for controlling the speed of said motor, and for ultimately controlling rotational speed of said screw auger transfer and working elements, in part in response to the moisture content sensed by said moisture sensor, wherein rotation speed of said motor is controlled to complete production of secondary food product from said primary food product waste by obtaining secondary food product from said screw auger transfer and working elements having a desired moisture content;

a delivery subsystem for receiving said secondary food product having a desired moisture content from said screw auger transfer and working element in a sealed fashion, and retaining said product for further processing or distribution; and a pelletization subsystem communicatively connected to said delivery subsystem such that secondary food product may be provided to said pelletization subsystem from said delivery subsystem and pelletized;

wherein said system is specifically configured for the production of animal or domestic pet feed.

* * * * *